US012354122B2

(12) United States Patent
Lin et al.

(10) Patent No.: US 12,354,122 B2
(45) Date of Patent: Jul. 8, 2025

(54) GOLDEN PATH SEARCH METHOD FOR MANUFACTURING PROCESS AND SYSTEM THEREOF

(71) Applicant: NATIONAL CHENG KUNG UNIVERSITY, Tainan (TW)

(72) Inventors: Chin-Yi Lin, Taipei (TW); Fan-Tien Cheng, Tainan (TW); Ching-Kang Ing, Hsinchu (TW); Yu-Ming Hsieh, Kaohsiung (TW); Po-Hsiang Peng, Hsinchu (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 185 days.

(21) Appl. No.: 18/048,853

(22) Filed: Oct. 23, 2022

(65) Prior Publication Data

US 2023/0153846 A1 May 18, 2023

Related U.S. Application Data

(60) Provisional application No. 63/264,241, filed on Nov. 18, 2021.

(30) Foreign Application Priority Data

Jul. 11, 2022 (TW) .................................. 111125841

(51) Int. Cl.
*G06Q 10/00* (2023.01)
*G06Q 30/0202* (2023.01)
*G06Q 50/04* (2012.01)

(52) U.S. Cl.
CPC ......... *G06Q 30/0202* (2013.01); *G06Q 50/04* (2013.01)

(58) Field of Classification Search
None
See application file for complete search history.

(56) References Cited

U.S. PATENT DOCUMENTS 8,095,484 B2    1/2012  Cheng et al.
10,956,835 B2 *  3/2021  Shi .......................... G06N 5/01
(Continued)

OTHER PUBLICATIONS

Nieman, Gary, How We Use Golden Paths to Solve Fragmentation in Our Software Ecosystem, Aug. 17, 2020, R&D Engineering, https://engineering.atspotify.com/2020/08/how-we-use-golden-paths-to-solve-fragmentation-in-our-software-ecosystem/, p. 1-9. (Year: 2020).*

(Continued)

*Primary Examiner* — Joseph M Waesco
(74) *Attorney, Agent, or Firm* — CKC & Partners Co., LLC

(57) ABSTRACT

A golden path search method for manufacturing process provides a two-phase process to search for a golden path. A first phase step of the two-phase process includes preparing a search model based on a search algorithm, and selecting a plurality of key process stages of a plurality of process stages by feeding sets of final inspection values and the production paths of the workpieces into the searching model, and then generating a plurality of key paths according to the key process stages. A second phase step of the two-phase process includes building a plurality of prediction models of the key paths according to the production paths and the sets of final inspection values, and predicting a plurality of yield rates corresponding to the key paths according to the prediction models, and then searching for the golden path of the key paths according to the yield rates.

12 Claims, 10 Drawing Sheets

(56) References Cited

U.S. PATENT DOCUMENTS

| | | | |
|---|---|---|---|
| 2010/0249976 A1* | 9/2010 | Aharoni | G05B 23/0229 700/121 |
| 2013/0006406 A1* | 1/2013 | Aharoni | G05B 23/0229 700/97 |
| 2017/0153630 A1* | 6/2017 | Cheng | G05B 19/41875 |
| 2018/0148076 A1* | 5/2018 | Chien | B61B 13/00 |
| 2018/0355411 A1* | 12/2018 | Drezek | C12Q 1/6816 |
| 2019/0095787 A1* | 3/2019 | Kung | G06V 10/764 |
| 2019/0286506 A1* | 9/2019 | Cheng | G06F 11/0793 |
| 2019/0354094 A1* | 11/2019 | Lin | G06F 16/24578 |
| 2021/0133911 A1* | 5/2021 | Yao | G06N 3/084 |
| 2022/0230268 A1* | 7/2022 | Yao | G06N 20/20 |

OTHER PUBLICATIONS

Ming Yuan et al., "Model Selection and Estimation in Regression With Grouped Variables", Journal of the Royal Statistical Society Series B, vol. 68, No. 1, pp. 49-67, 2006.

Ngai Hang Chan et al., "Threshold Estimation via Group Orthogonal Greedy Algorithm", Journal of Business & Economic Statistics, pp. 1-39, Aug. 12, 2015.

\* cited by examiner

GOLDEN PATH SEARCH METHOD FOR MANUFACTURING PROCESS AND SYSTEM THEREOF

RELATED APPLICATIONS

This application claims the benefit of the Provisional Application Ser. No. 63/264,241, filed on Nov. 18, 2021; and Taiwan Application Serial Number 111125841, filed on Jul. 11, 2022. The entire disclosures of all the above applications are hereby incorporated by reference herein.

BACKGROUND

Field of Invention

The present invention relates to a path search method for manufacturing process and a system thereof. More particularly, the present invention relates to a golden path search method for manufacturing process and a system thereof.

Description of Related Art

Yield enhancement becomes the crucial indicator of enterprise profits, especially in research-and-development (R&D) and mass production phases. Product yield directly affects production cost. Manufacturers all seek to quickly enhance the product yield during development and mass-production phases. In other words, when a yield loss occurs, its root causes should be found rapidly in both the development and mass-production phases. When the yield loss is encountered, a conventional yield enhancement approach is to collect all production-related data to perform a big data analysis in order to find out the root causes causing the yield loss and remedy them. However, the amount of production-related data is often enormous and complicated, and thus it is very difficult to search for the root causes of the yield loss from production-related data.

In general, Zero-Defect (ZD) of all the deliverables can be achieved by discarding the defective products via a real-time and online total inspection technology, such as Automatic Virtual Metrology (AVM). Further, the Key-variable Search Algorithm (KSA) of the Intelligent Yield Management (IYM) system developed by our research team can be utilized to find out the root causes of the defects for continuous improvement on those defective products. As such, nearly ZD of all products may be achieved. However, in a multistage manufacturing process (MMP) environment, a workpiece may randomly pass through one of the manufacturing devices with the same function in each stage. Different devices of the same type perform differently in each stage, where the performances will be accumulated through the designated manufacturing process and affect the final yield. KSA can only identify the influence of univariate variables (i.e., single devices) on the yield, yet it cannot detect the manufacturing paths that have significant influence on the yield.

Therefore, a golden path search method for manufacturing process and a system thereof which are capable of searching a golden path with better yield rate in the MMP paths and having high reliability are commercially desirable.

SUMMARY

An object of the present invention is to provide a golden path search method for manufacturing process and a system thereof including a golden path search algorithm (GPSA). The GPSA can plan the golden path with high yield under the condition of the number of variables being much larger than that of samples, thus effectively improving the manufacturing yield. Hence, the GPSA is suitable for the multi-stage manufacturing process (MMP) environment. In addition, the GPSA can be realized by two specific phase steps, and the golden path can include the untraveled path, so that the golden path search can be considered comprehensively. Moreover, the two specific phase steps can search the golden path from all possible manufacturing paths of the production line, so that the golden path may be used by product manufacturers to effectively improve the manufacturing yield, and the reliability of the golden path searched by the present disclosure is quite high. Furthermore, by predicting the yield rates according to the best model and ranking the yield rates of the two specific phase steps, the present disclosure can simultaneously check all orders of the key paths and all order prediction models corresponding to the orders to select the best model and the golden path corresponding to the best one of the yield rates. Moreover, the present disclosure can consider the interaction between/among the key process devices to reflect the effect of the yield rates caused by the interaction between/among the key process devices.

According to one aspect of the present disclosure, a golden path search method for manufacturing process includes a plurality of steps. A first one of the steps includes providing a production line including a plurality of process stages. Each of the process stages includes a plurality of process devices, and each of the process devices is configured for processing one of a plurality of workpieces. A second one of the steps includes processing the workpieces according to a plurality of production paths respectively. Each of the production paths indicates each of the process devices in the process stages for processing one of the workpieces. A third one of the steps includes performing at least one yield test on each of the workpieces after passing through the production line, thereby obtaining a plurality of sets of final inspection values corresponding to the workpieces respectively. A fourth one of the steps includes performing a first phase step. The first phase step includes preparing a searching model based on a searching algorithm. The searching algorithm is one of a group least absolute shrinkage and selection operator (Group LASSO) algorithm and a group orthogonal greedy algorithm (Group OGA). The first phase step further includes selecting a plurality of key process stages of the process stages by feeding the sets of final inspection values and the production paths of the workpieces into the searching model, and then generating a plurality of key paths according to the key process stages. A fifth one of the steps includes performing a second phase step. The second phase step includes building a plurality of prediction models of the key paths according to the production paths and the sets of final inspection values; and predicting a plurality of yield rates corresponding to the key paths according to the prediction models, and then searching a golden path of the key paths according to the yield rates. The golden path is corresponding to a best one of the yield rates.

Therefore, the golden path search method for manufacturing process of the present disclosure can search the golden path by two specific phase steps, and the golden path can include the untraveled path, so that the golden path search can be considered comprehensively. In addition, the two specific phase steps can search the golden path from all possible manufacturing paths of the production line via the key process stages to greatly reduce the number of paths to be confirmed, thereby effectively improving the efficiency of path search, so that the golden path may be used by product manufacturers to effectively improve the manufacturing yield, and the reliability of the golden path searched by the present disclosure is quite high. Moreover, by predicting the yield rates according to the best model and ranking the yield rates of the two specific phase steps, the present disclosure can simultaneously check all orders of the key paths and all order prediction models corresponding to the orders to select the best model and the golden path corresponding to the best one of the yield rates. Furthermore, the present disclosure can consider the interaction between/among the key process devices to reflect the effect of the yield rates caused by the interaction between/among the key process devices.

In some embodiments, the first phase step further includes counting a passing rate of each of the workpieces passing through each of the process devices, so that the process devices have a plurality of the passing rates, and then filtering out a part of the process devices whose passing rates are smaller than a predetermined passing rate. The predetermined passing rate is smaller than or equal to 5%.

In some embodiments, in the second phase step, the prediction models of the key paths include an interaction between at least two of the process devices of the process stages.

In some embodiments, the second phase step further includes using an information criterion to calculate at least one information criterion value of each of the prediction models of each of the key paths. Each of the prediction models has at least one order and includes at least one order prediction model, and the at least one information criterion value is corresponding to the at least one order and the at least one order prediction model. The second phase step further includes choosing one of the at least one order prediction model as a best model. The one of the at least one order prediction model has a smallest value of the at least one information criterion value.

In some embodiments, the information criterion is an Akaike Information Criterion (AIC), and a number of the at least one order is smaller than 5.

In some embodiments, the second phase step further includes ranking the yield rates of the key paths to obtain a path ranking. The path ranking includes the golden path. The second phase step further includes calculating a correlation between the production paths and the sets of final inspection values, and a maximum value and a minimum value of the sets of final inspection values, thereby obtaining a reliance index to gauge a reliance level of identified results.

In some embodiments, one of the key paths includes a plurality of key process devices. The key process devices are corresponding to the key process stages, respectively. The one of the key paths is classified as one of an untraveled path and a traveled path. The untraveled path represents that the one of the workpieces has not been processed by all of the key process devices in the key process stages when passing through the production line, and the traveled path represents that the one of the workpieces has been processed by all of the key process devices in the key process stages when passing through the production line.

According to another aspect of the present disclosure, a golden path search system for manufacturing process is configured to search a golden path of a production line. The production line includes a plurality of process stages. Each of the process stages includes a plurality of process devices, and each of the process devices is configured for processing one of a plurality of workpieces. The golden path search system for manufacturing process includes a memory and a processor. The memory stores production information and a plurality of sets of final inspection values corresponding to the workpieces. The production information includes a plurality of production paths. Each of the production paths indicates each of the process devices in the process stages for processing one of the workpieces, and the sets of final inspection values are obtained by performing at least one yield test on each of the workpieces after passing through the production line. The processor is electrically connected to the memory. The processor receives the production paths and the sets of final inspection values, and is configured to perform a first phase step and a second phase step. The first phase step includes preparing a searching model based on a searching algorithm. The searching algorithm is one of a group least absolute shrinkage and selection operator (Group LASSO) algorithm and a group orthogonal greedy algorithm (Group OGA). The first phase step further includes selecting a plurality of key process stages of the process stages by feeding the sets of final inspection values and the production paths of the workpieces into the searching model, and then generating a plurality of key paths according to the key process stages. The second phase step includes building a plurality of prediction models of the key paths according to the production paths and the sets of final inspection values; and predicting a plurality of yield rates corresponding to the key paths according to the prediction models, and then searching the golden path of the key paths according to the yield rates. The golden path is corresponding to a best one of the yield rates.

Therefore, the golden path search system for manufacturing process of the present disclosure can search the golden path by two specific phase steps, and the golden path can include the untraveled path, so that the golden path search can be considered comprehensively. In addition, the two specific phase steps can search the golden path from all possible manufacturing paths of the production line via the key process stages to greatly reduce the number of paths to be confirmed, thereby effectively improving the efficiency of path search, so that the golden path may be used by product manufacturers to effectively improve the manufacturing yield, and the reliability of the golden path searched by the present disclosure is quite high. Moreover, by predicting the yield rates according to the best model and ranking the yield rates of the two specific phase steps, the present disclosure can simultaneously check all orders of the key paths and all order prediction models corresponding to the orders to select the best model and the golden path corresponding to the best one of the yield rates. Furthermore, the present disclosure can consider the interaction between/among the key process devices to reflect the effect of the yield rates caused by the interaction between/among the key process devices.

In some embodiments, the first phase step further includes counting a passing rate of each of the workpieces passing through each of the process devices, so that the process devices have a plurality of the passing rates, and then filtering out a part of the process devices whose passing rates are smaller than a predetermined passing rate. The predetermined passing rate is smaller than or equal to 5%.

In some embodiments, in the second phase step, the prediction models of the key paths include an interaction between at least two of the process devices of the process stages.

In some embodiments, the second phase step further includes using an information criterion to calculate at least one information criterion value of each of the prediction models of each of the key paths. Each of the prediction models has at least one order and includes at least one order prediction model, and the at least one information criterion value is corresponding to the at least one order and the at least one order prediction model. The second phase step further includes choosing one of the at least one order prediction model as a best model. The one of the at least one order prediction model has a smallest value of the at least one information criterion value.

In some embodiments, the information criterion is an Akaike Information Criterion (AIC), and a number of the at least one order is smaller than 5.

In some embodiments, the second phase step further includes ranking the yield rates of the key paths to obtain a path ranking. The path ranking includes the golden path. The second phase step further includes calculating a correlation between the production paths and the sets of final inspection values, and a maximum value and a minimum value of the sets of final inspection values, thereby obtaining a reliance index to gauge a reliance level of identified results.

In some embodiments, one of the key paths includes a plurality of key process devices. The key process devices are corresponding to the key process stages, respectively. The one of the key paths is classified as one of an untraveled path and a traveled path. The untraveled path represents that the one of the workpieces has not been processed by all of the key process devices in the key process stages when passing through the production line, and the traveled path represents that the one of the workpieces has been processed by all of the key process devices in the key process stages when passing through the production line.

BRIEF DESCRIPTION OF THE DRAWINGS

The invention can be more fully understood by reading the following detailed description of the embodiment, with reference made to the accompanying drawings as follows.

DESCRIPTION OF THE PREFERRED EMBODIMENTS

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device, module) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
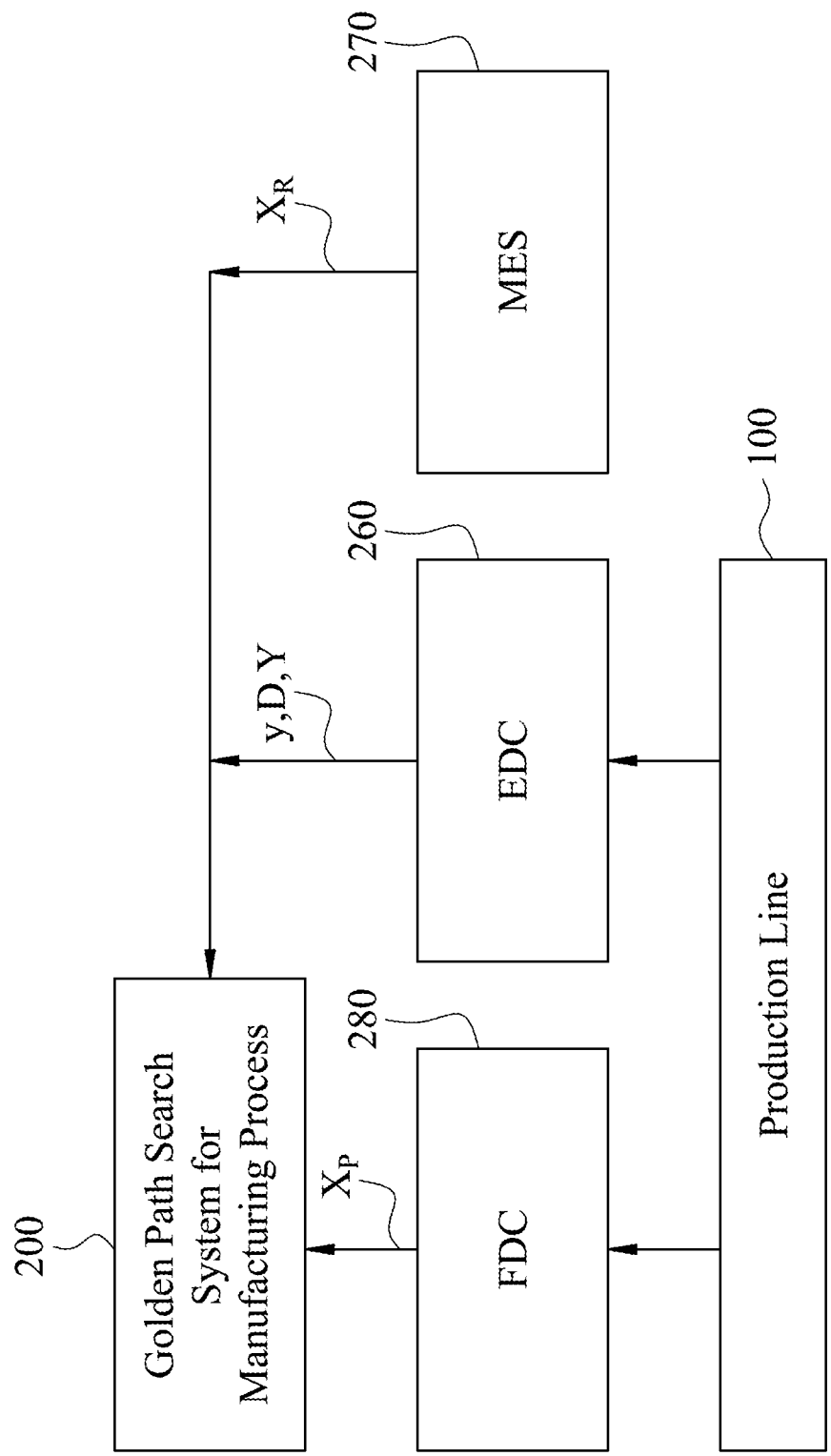
FIG. 1 is a schematic diagram showing a production system according to one embodiment of the present disclosure.
Figure 2:
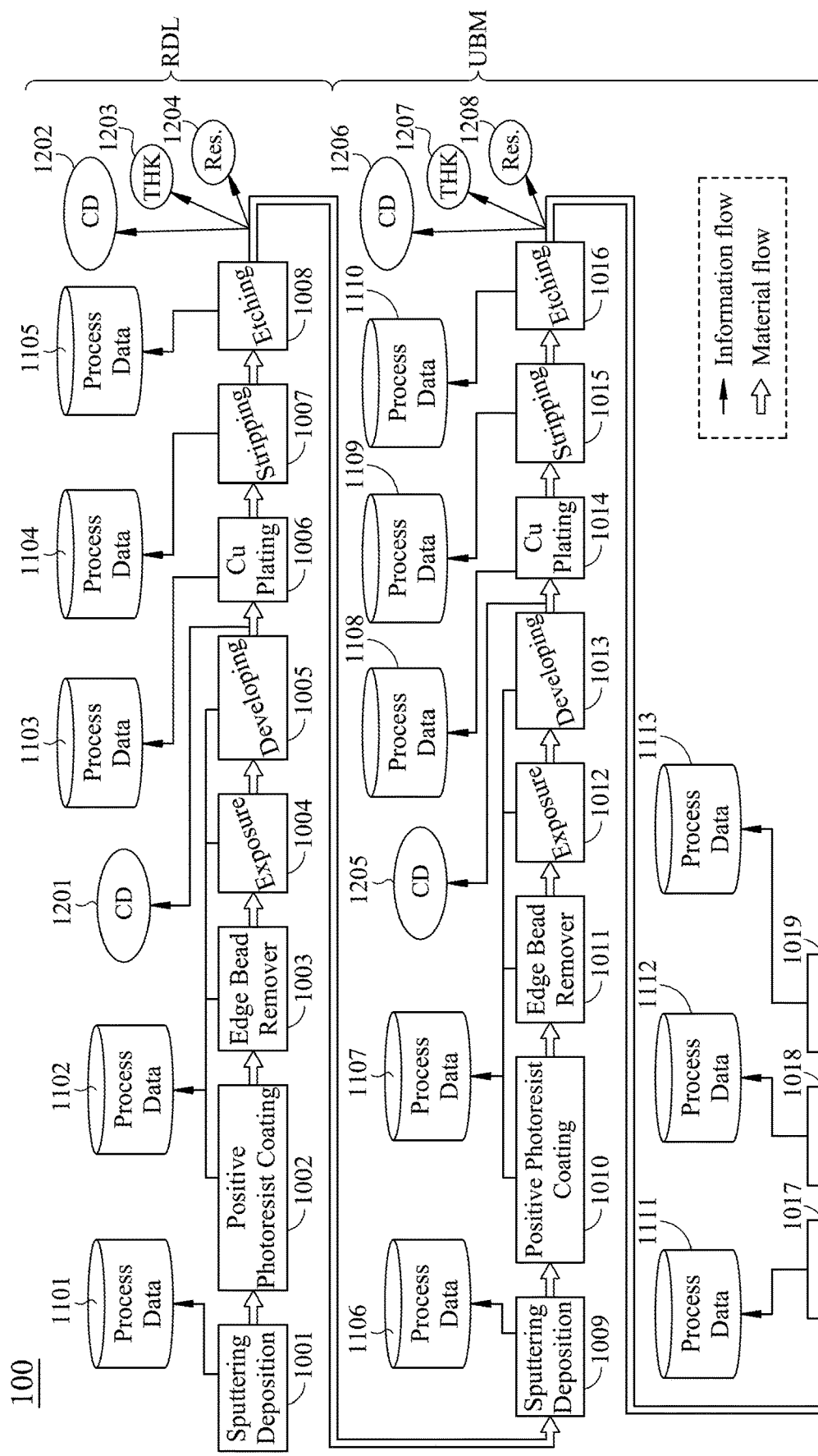
FIG. 2 is a schematic diagram showing a production line of FIG. 1.

Referring to FIG. 1, FIG. 1 is a schematic diagram showing a production system according to one embodiment of the present disclosure. In FIG. 1, the production system includes a production line 100, a golden path search system 200 for manufacturing process, an engineering data collection (EDC) system 260, a manufacturing execution system (MES) 270 and a fault detection and classification (FDC) system 280. The EDC system 260 is configured to collect plural sets of in-line data (y, i.e., in-line metrology values), defects (D) and plural sets of final inspection values (Y) corresponding to workpieces that have been processed in the production line 100. The MES 270 is configured to store production paths ($X_R$) of the workpieces. The FDC system 280 is configured to collect values of process parameters of respective process devices on the production line 100 and to monitor health states of the process devices, in which the values of process parameters are collected by sensors. The golden path search system 200 for manufacturing process is configured to search a golden path of the production line 100.

Figure 3:
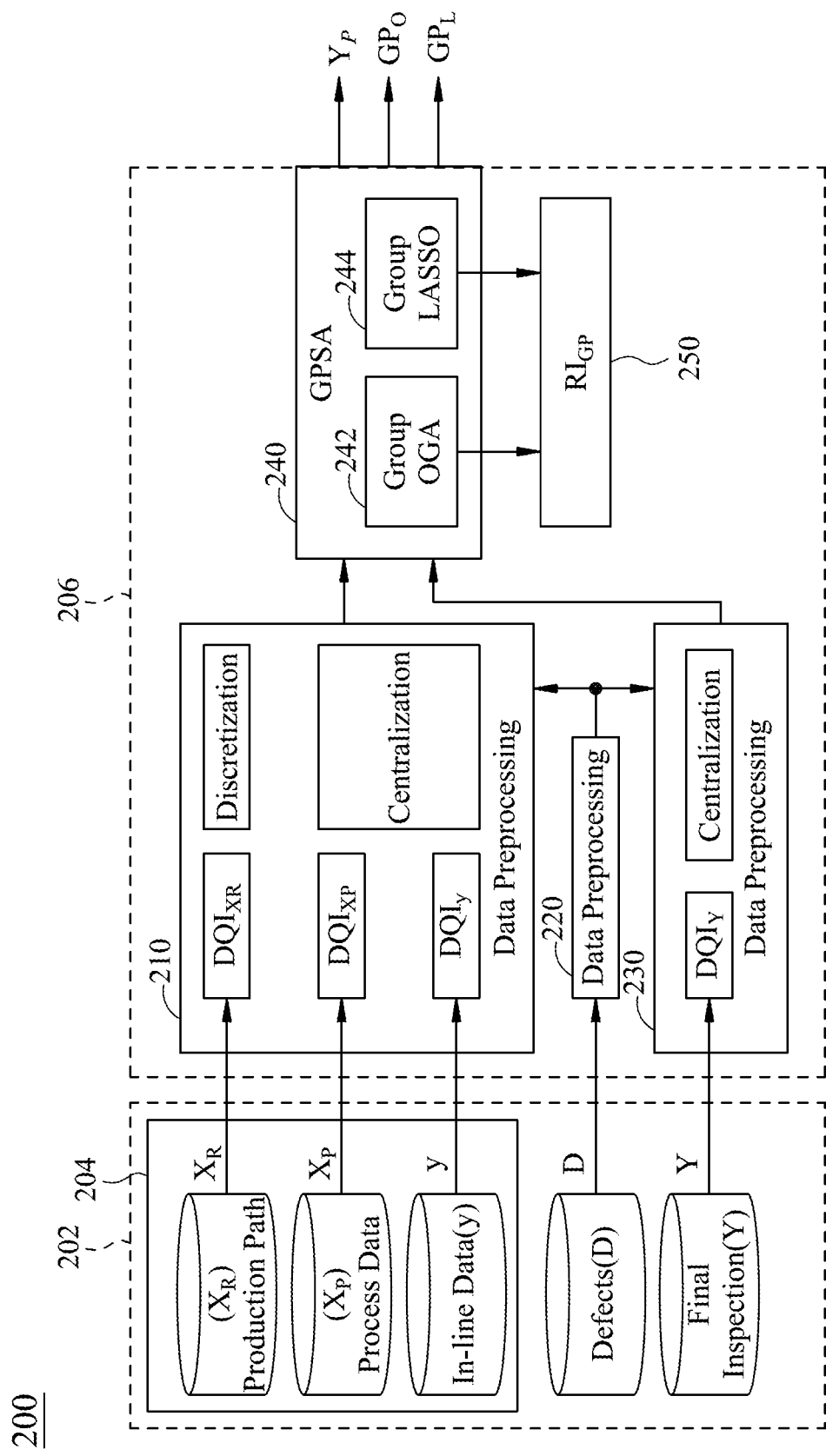
FIG. 3 is a schematic block diagram showing a golden path search system for manufacturing process according to one embodiment of the present disclosure.
Figure 4:
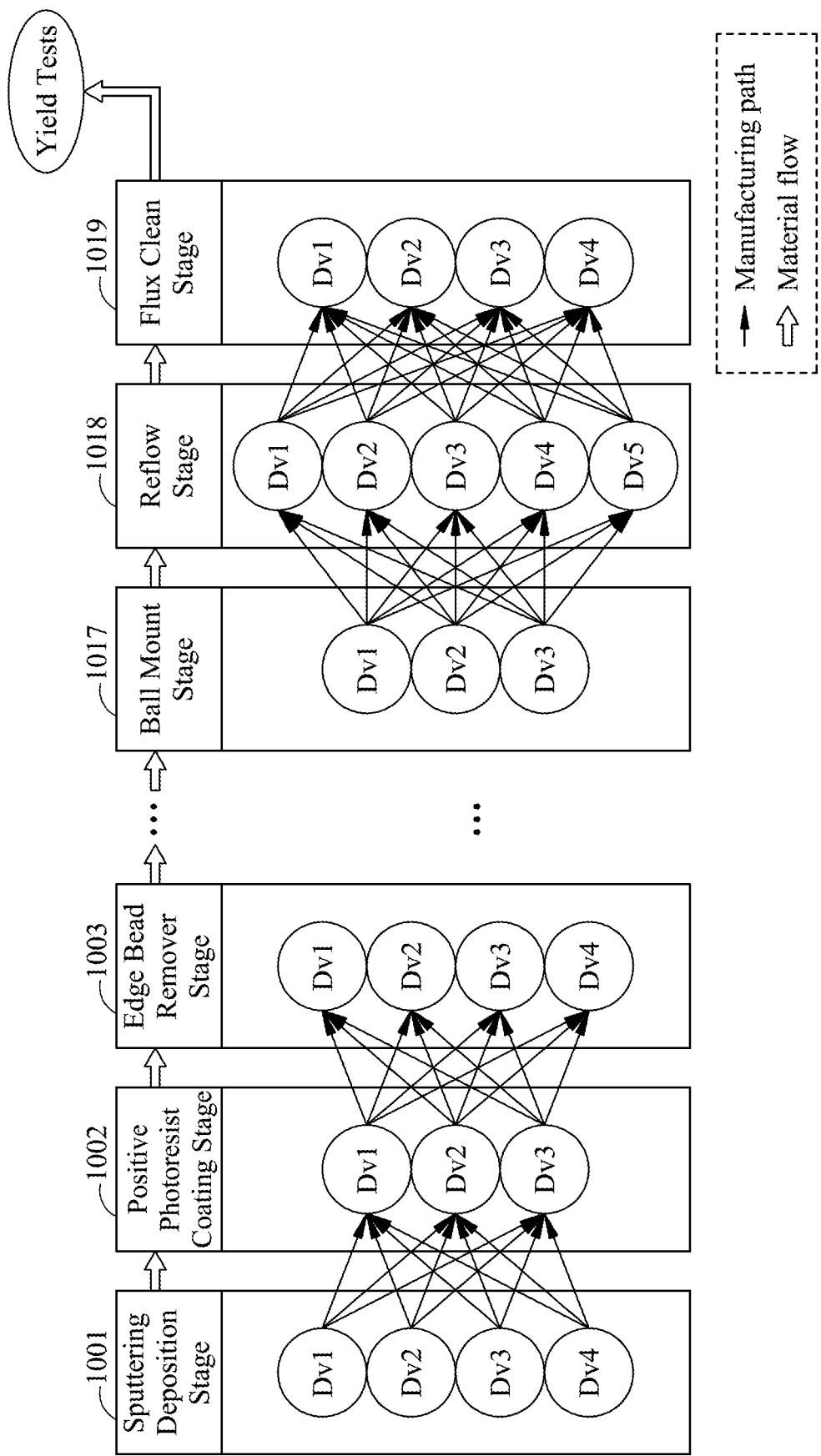
FIG. 4 is a schematic diagram showing all possible manufacturing paths of the production line of FIG. 2.

Referring to FIGS. 1, 2, 3 and 4, FIG. 2 is a schematic diagram showing a production line 100 of FIG. 1; FIG. 3 is a schematic block diagram showing a golden path search system 200 for manufacturing process according to one embodiment of the present disclosure; and FIG. 4 is a schematic diagram showing all possible manufacturing paths of the production line 100 of FIG. 2. The production line 100 includes a plurality of process stages 1001, 1002, 1003, 1004, 1005, 1006, 1007, 1008, 1009, 1010, 1011, 1012, 1013, 1014, 1015, 1016, 1017, 1018 and 1019. Each of the process stages includes a plurality of process devices (e.g., Dv1, Dv2, Dv3, Dv4 and Dv5 in FIG. 4). Each of the process devices is configured for processing one of a plurality of workpieces.

For example, in the semiconductor packaging technology, the bumping process can include two sub-layers, i.e., Re-Distribution Layer (RDL) and Under Bump Metallurgy (UBM). Each of the two sub-layers includes the following process stages: Sputtering Deposition (e.g., sputtering deposition stages 1001, 1009), Photoresist (including positive photoresist coating stages 1002, 1010, edge bead remover stages 1003, 1011, exposure stages 1004, 1012 and developing stages 1005, 1013), Cu Plating (e.g., Cu plating stages 1006, 1014), Stripping (e.g., stripping stages 1007, 1015) and Etching (e.g., etching stages 1008, 1016). In addition, the UBM bumping process further includes a ball mount stage 1017, a reflow stage 1018 and a flux clean stage 109. In production, each of the workpieces passes through the process stages 1001-1019 one after one, and finally receives final tests (yield tests), thereby obtaining plural sets of final inspection values corresponding to the workpieces respectively. Table 1 lists the number of process devices in each of the process stages 1001-1019. In FIG. 4 and Table 1, the total number of all possible manufacturing paths of the production line 100 is 4×3×4× . . . ×3×5×4=1,433,272,320.

TABLE 1

| Sub-layer | Process stages | The number of process devices |
| --- | --- | --- |
| RDL | Sputtering Deposition | 4 |
| RDL | Positive Photoresist Coating | 3 |
| RDL | Edge Bead Remover | 4 |
| RDL | Exposure | 4 |
| RDL | Developing | 3 |
| RDL | Cu Plating | 3 |
| RDL | Stripping | 2 |
| RDL | Etching | 4 |
| UBM | Sputtering Deposition | 3 |
| UBM | Positive Photoresist Coating | 3 |
| UBM | Edge Bead Remover | 2 |
| UBM | Exposure | 2 |
| UBM | Developing | 2 |
| UBM | Cu Plating | 3 |
| UBM | Stripping | 2 |
| UBM | Etching | 4 |
| UBM | Ball Mount | 3 |
| UBM | Reflow | 5 |
| UBM | Flux Clean | 4 |

At each of the process stages 1001-1019, each of the workpieces is only processed in one process device of each of the process stages 1001-1019. After being processed by a predetermined process device of each of the process stages 1001-1019, metrology is performed on each of the workpieces, thereby obtaining plural sets of in-line metrology values corresponding to the workpieces, in which the metrology may be actual measurements by metrology tools or virtual metrology, such as in-line metrology values 1201 (critical dimension, CD), 1202 (CD), 1203 (thickness, THK), 1204 (resistance, Res.), 1205 (CD), 1206 (CD), 1207 (THK) and 1208 (Res.) shown in FIG. 2. While each of the workpieces is processed in a process device, values of process parameters are collected by for example sensors, such as process data 1101, 1102, 1103, 1104, 1105, 1106, 1107, 1108, 1109, 1110, 1111, 1112 and 1113 shown in FIG. 2.

In FIG. 3, the golden path search system 200 for manufacturing process includes a memory 202 and a processor 206. The memory 202 may include a random access memory (RAM) or another type of dynamic storage device that may store information and instructions for execution by the processor 206. The processor 206 may include any type of processor, microprocessor, or processing logic that may interpret and execute instructions (e.g., a field programmable gate array (FPGA)). The processor 206 may include a single device (e.g., a single core) and/or a group of devices (e.g., multi-core).

The memory 202 stores production information 204 and a plurality of sets of final inspection values (Y) corresponding to the workpieces. The production information 204 includes a plurality of production paths ($X_R$). Each of the production paths ($X_R$) indicates each of the process devices in the process stages for processing one of the workpieces, and the sets of final inspection values (Y) are obtained by performing at least one yield test on each of the workpieces after passing through the production line 100. In detail, the memory 202 stores the production information 204, defects (D) and plural sets of final inspection values (Y) corresponding to the workpieces after being processed in the production line 100. The production information 204 includes the production paths ($X_R$), values of the process data ($X_P$) of the workpieces and plural sets of in-line metrology values (y) of the workpieces, in which the process data ($X_P$) include process parameters and inter-tool parameters, and may be obtained by the FDC system 280 in FIG. 1, for example. Each of the production paths ($X_R$) indicates each of the process devices in the process stages for processing one of the workpieces, such as the process device Dv1 in the process stage 1001 shown in FIG. 4. The production paths ($X_R$) may be obtained by the MES 270 in FIG. 1, for example. The sets of in-line metrology values (y) are obtained by performing metrology on the workpieces promptly after being processed by their process devices, and the sets of final inspection values (Y) are obtained by performing at least one yield test on each of the workpieces after passing through the production line 100. Defects (D) could happen in any process stage, thus they are also imported for analysis. Then, the processed defects (D) may join the production information 204 or the final inspection values (Y) depending on the nature of the defects (D). The sets of in-line metrology values (y), the defects (D) and the final inspection values (Y) may be obtained by the EDC system 260 in FIG. 1, for example.

The processor 206 is electrically connected to the memory 202. The processor 206 receives the production paths ($X_R$) and the sets of final inspection values (Y), and is configured to perform a golden path search method 300 for manufacturing process (shown in FIG. 5). In the processor 206, data preprocessing steps 210, 220 and 230 are conducted to assure the data quality of all the inputs: the production information 204 ($X_R$, $X_P$ and y), the defects (D) and the final inspection values (Y). The characteristics of these inputs are described below. $X_R$ needs to be discretized into 1 or 0, which indicates that the workpiece getting through this process stage or not. $X_P$ contains data of the process parameters (such as voltage, pressure, temperature, etc.) of the process devices and data of the inter-tool parameters which need to be centralized. y stands for in-line data (such as critical dimension, thickness, etc.) which need to be centralized. As for D, different companies have different definitions of defects, and thus discussion with domain experts is required before executing data-preprocessing and quality check. Y stands for the yield test results (final inspection values) that should be centralized.

The data quality evaluation algorithm of $X_R$, denoted as a process data quality index ($DQI_{X_R}$), evaluates the following facts: 1) while a process stage may contain several process devices of the same type, the process stage utilizes only one of the process devices; 2) if a production line should get through multiple process devices (such as three process devices) of the same process device type, then the production line has three process stages at which the three process devices are located respectively; 3) if a process device is used in different production lines, the same device in a different production line would be considered as a different process stage; 4) there are only two possibilities for a workpiece passing through the process device: get through ("1") or not ("0"); 5) a workpiece cannot get through any process device that does not belong to that process stage.

Similarly, the data quality evaluation algorithms of $X_P$ and y are denoted as $DQI_{X_P}$, and $DQI_y$, respectively. The data quality evaluation algorithm of Y is denoted as $DQI_Y$. Both $DQI_{X_P}$ and $DQI_y$ adopt the algorithms similar to the process data quality evaluation scheme utilized in U.S. Pat. No. 8,095,484 B2, and $DQI_Y$ also applies the algorithm similar to the metrology data quality evaluation scheme used in U.S. Pat. No. 8,095,484 B2. U.S. Pat. No. 8,095,484 B2 is hereby incorporated by reference.

After performing the data preprocessing steps 210, 220 and 230, the processor 206 performs a step 240 of a golden path search algorithm (GPSA) and a step 250 for calculating a reliance index ($RI_{GP}$). The step 240 of the golden path search algorithm (GPSA) includes a group orthogonal greedy algorithm (Group OGA) 242 and a group least absolute shrinkage and selection operator (Group LASSO) algorithm 244, thereby searching a golden path with a best one (or a better one) of the yield rates from all possible manufacturing paths (e.g., 1,433,272,320 paths) of the production line 100. Then, the golden path is used by product manufacturers to effectively improve the manufacturing yield. The detail of the step 240 of the golden path search algorithm (GPSA) and the step 250 for calculating the reliance index ($RI_{GP}$) is described in following FIG. 5.

Referring to FIGS. 1, 2, 3, 4 and 5, FIG. 5 is a flow chart showing a golden path search method 300 for manufacturing process according to one embodiment of the present disclosure. The processor 206 is configured to the golden path search method 300 for manufacturing process, and the golden path search method 300 for manufacturing process includes a data obtaining step and a plurality of processing steps S02, S04, S06 and S08.

The data obtaining step includes obtaining the production information 204, defects (D) and plural sets of final inspection values (Y) corresponding to the workpieces after being processed in the production line 100. The production information 204 includes the production paths ($X_R$), values of the process data ($X_P$) of the workpieces and plural sets of in-line metrology values (y) of the workpieces. In detail, the data obtaining step includes providing a production line 100 including a plurality of process stages 1001-1019. Each of the process stages 1001-1019 includes a plurality of process devices (e.g., Dv1, Dv2, Dv3, Dv4 and Dv5 in FIG. 4), and each of the process devices is configured for processing one of a plurality of workpieces. Then, the data obtaining step further includes processing the workpieces according to a plurality of production paths ($X_R$) respectively. Each of the production paths ($X_R$) indicates each of the process devices in the process stages 1001-1019 for processing one of the workpieces. Then, the data obtaining step further includes performing at least one yield test on each of the workpieces after passing through the production line 100, thereby obtaining a plurality of sets of final inspection values (Y) corresponding to the workpieces respectively. Finally, the data obtaining step further includes obtaining the production information 204, defects (D) and plural sets of final inspection values (Y) via the EDC system 260, the MES 270 and the FDC system 280.

The processing step S02 includes performing the data preprocessing steps 210, 220 and 230, i.e., conducting data preprocessing and quality evaluation. The processing steps S04, S06 include performing the step 240 of the golden path search algorithm (GPSA). The processing step S04 includes performing a first phase step to identify key process stages and key paths. The processing step S06 includes performing a second phase step to predict yield rates of the key paths. The processing step S08 includes performing the step 250 for calculating the reliance index ($RI_{GP}$), i.e., confirming the reliance index of the key paths.

Figure 5:
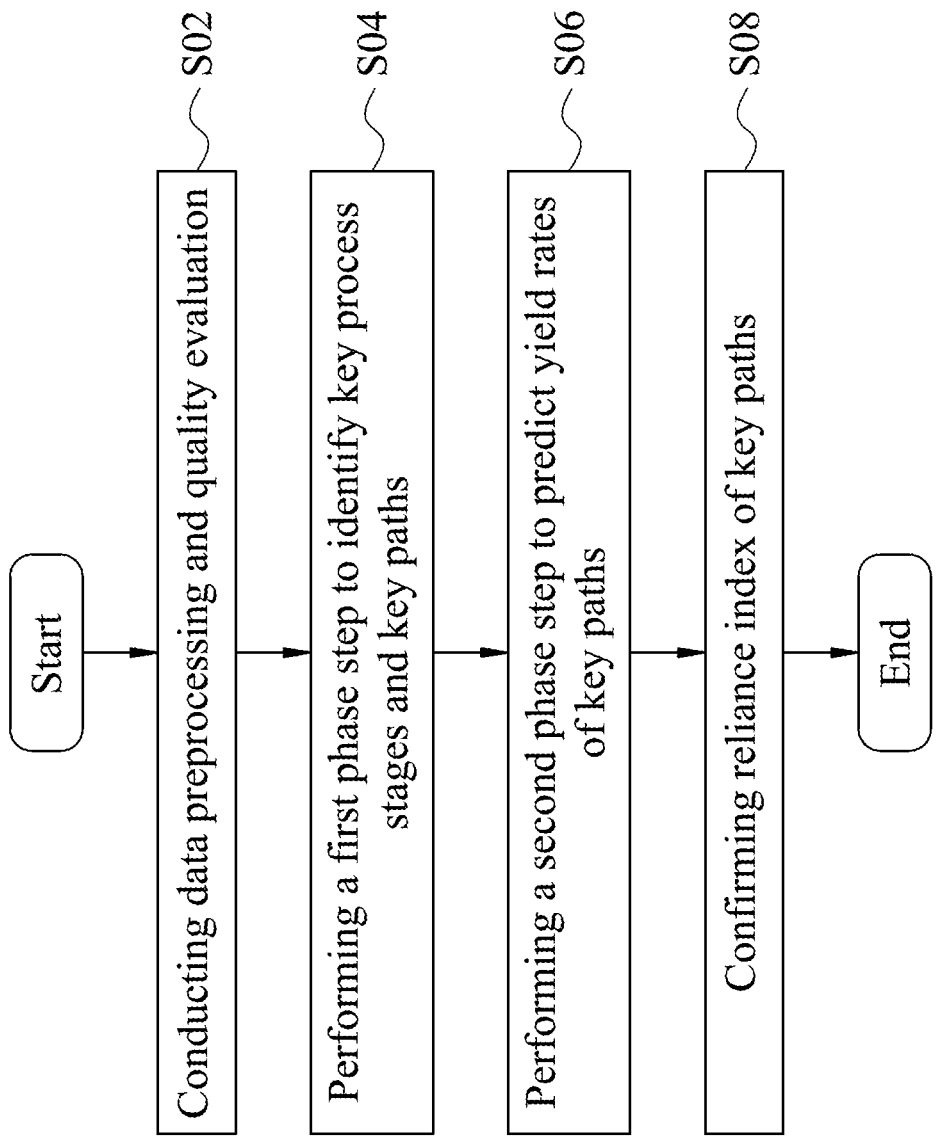
FIG. 5 is a flow chart showing a golden path search method for manufacturing process according to one embodiment of the present disclosure.
Figure 6:
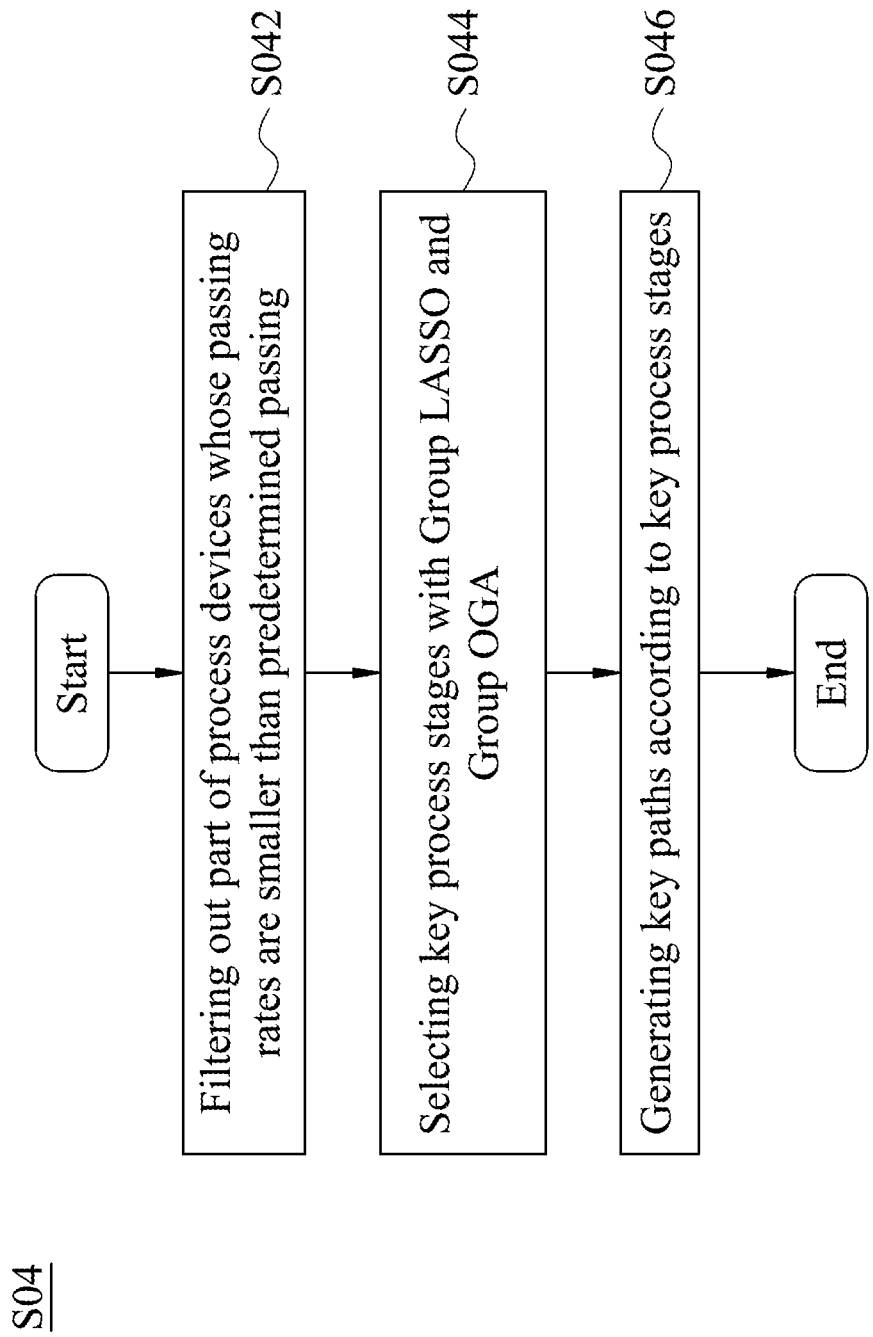
FIG. 6 is a schematic diagram showing a first phase step of FIG. 5.
Figure 7:
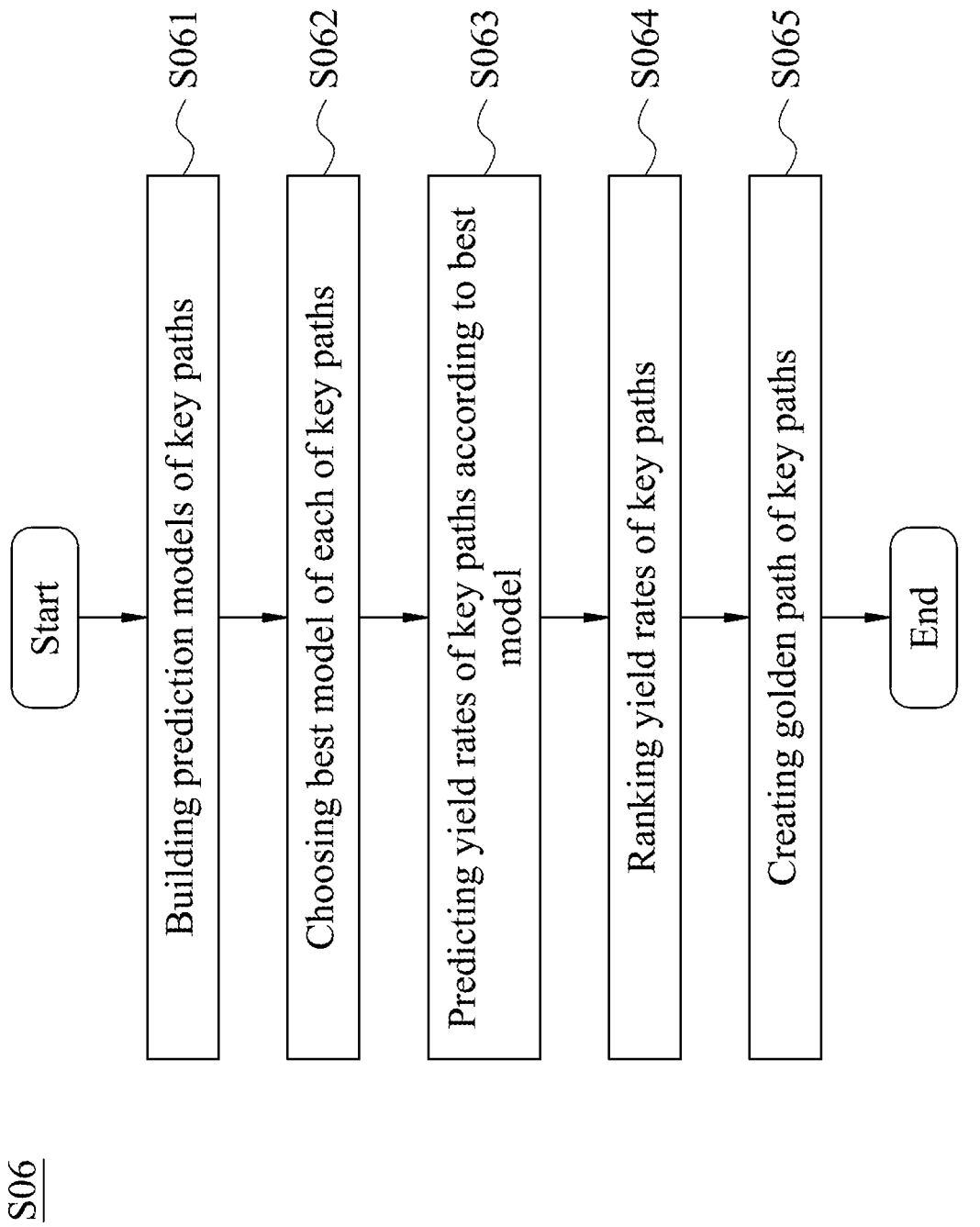
FIG. 7 is a schematic diagram showing a second phase step of FIG. 5.

Referring to FIGS. 5, 6 and 7, FIG. 6 is a schematic diagram showing a first phase step (the processing step S04) of FIG. 5; and FIG. 7 is a schematic diagram showing a second phase step (the processing step S06) of FIG. 5. The processing step S04 includes performing the first phase step (Phase-I), and the first phase step includes a plurality of steps S042, S044 and S046. The step S042 represents "Filtering out part of process devices whose passing rates are smaller than predetermined passing rate" and includes counting a passing rate of each of the workpieces passing through each of the process devices, so that the process devices have a plurality of the passing rates, and then filtering out a part of the process devices whose passing rates are smaller than a predetermined passing rate (r %). In one embodiment, the predetermined passing rate (r %) is smaller than or equal to 5%, but the present disclosure is not limited thereto.

The step S044 represents "Selecting key process stages with Group LASSO and Group OGA" and includes preparing a searching model based on a searching algorithm. The searching algorithm is one of a group least absolute shrinkage and selection operator (Group LASSO) algorithm and a group orthogonal greedy algorithm (Group OGA). The Group LASSO algorithm is different from a conventional LASSO algorithm. The conventional LASSO algorithm is a shrinkage method which minimizes the residual sum of squares subject to the sum of the absolute value of the coefficients being less than a constant. Because of the nature of this constraint, the conventional LASSO algorithm tends to produce some coefficients that are exactly zero and hence gives interpretable models. Although all the independent variables can be processed at the same time via the conventional LASSO algorithm, the conventional LASSO algorithm cannot ensure that the variables in one group will be jointly selected into or eliminated from a model. However, the Group LASSO algorithm of the present disclosure can ensure that the variables in one group will be jointly selected into or eliminated from a model. In addition, the Group OGA is different from a conventional OGA. The conventional OGA is a stepwise regression method that considers the correlation between the production paths ($X_R$) and the final inspection values (Y). Although the conventional OGA can achieve selection consistency in high-dimensional linear regression models, the conventional OGA cannot ensure that the variables in one group will be jointly selected into or eliminated from a model. However, the Group OGA of the present disclosure can ensure that the variables in one group will be jointly selected into or eliminated from a model. Details of the Group LASSO algorithm used in embodiments of the present disclosure can be referenced to "Model selection and estimation in regression with grouped variables", by Ming Yuan and Yi Lin, Journal of the Royal Statistical Society, vol. 68, no. 1, pp. 49-67, 2006, which is hereby incorporated by reference. Details of the Group OGA used in embodiments of the present disclosure can be referenced to "Threshold estimation via group orthogonal greedy algorithm", by Ngai Hang Chan, Ching-Kang Ing, Yuanbo Li and Chun Yip Yau, Journal of Business & Economic Statistics, pp. 1-39, 12 Aug. 2015, which is hereby incorporated by reference.

The step S046 represents "Generating key paths according to key process stages" and includes selecting a plurality of key process stages of the process stages 1001-1019 by feeding the sets of final inspection values (Y) and the production paths ($X_R$) of the workpieces into the searching model, and then generating a plurality of key paths according to the key process stages. The production paths ($X_R$) and the sets of final inspection values (Y) can be expressed as equations (1) and (2):

$$X_R = \begin{bmatrix} x_{1R1} & \cdots & x_{1Rj} & \cdots & x_{1Rp} \\ \vdots & & \ddots & & \vdots \\ x_{nR1} & \cdots & x_{nRj} & \cdots & x_{nRp} \end{bmatrix} \quad (1).$$

$$Y = [Y_1 \ \ldots \ Y_n]^T \quad (2).$$

p represents the number of parameters indicating the total process device number a workpiece may go through, and n is the number of samples. The production paths ($X_R$) can be represented by $x_{iR_j}$, where i is a positive integer from 1 to n, and j is a positive integer from 1 to p. $x_{iR_j}$ is passing information which is equal to "1" or "0". "1" represents that the workpiece passes through the process device, and "0" represents that the workpiece does not pass through the process device.

Figure 8:
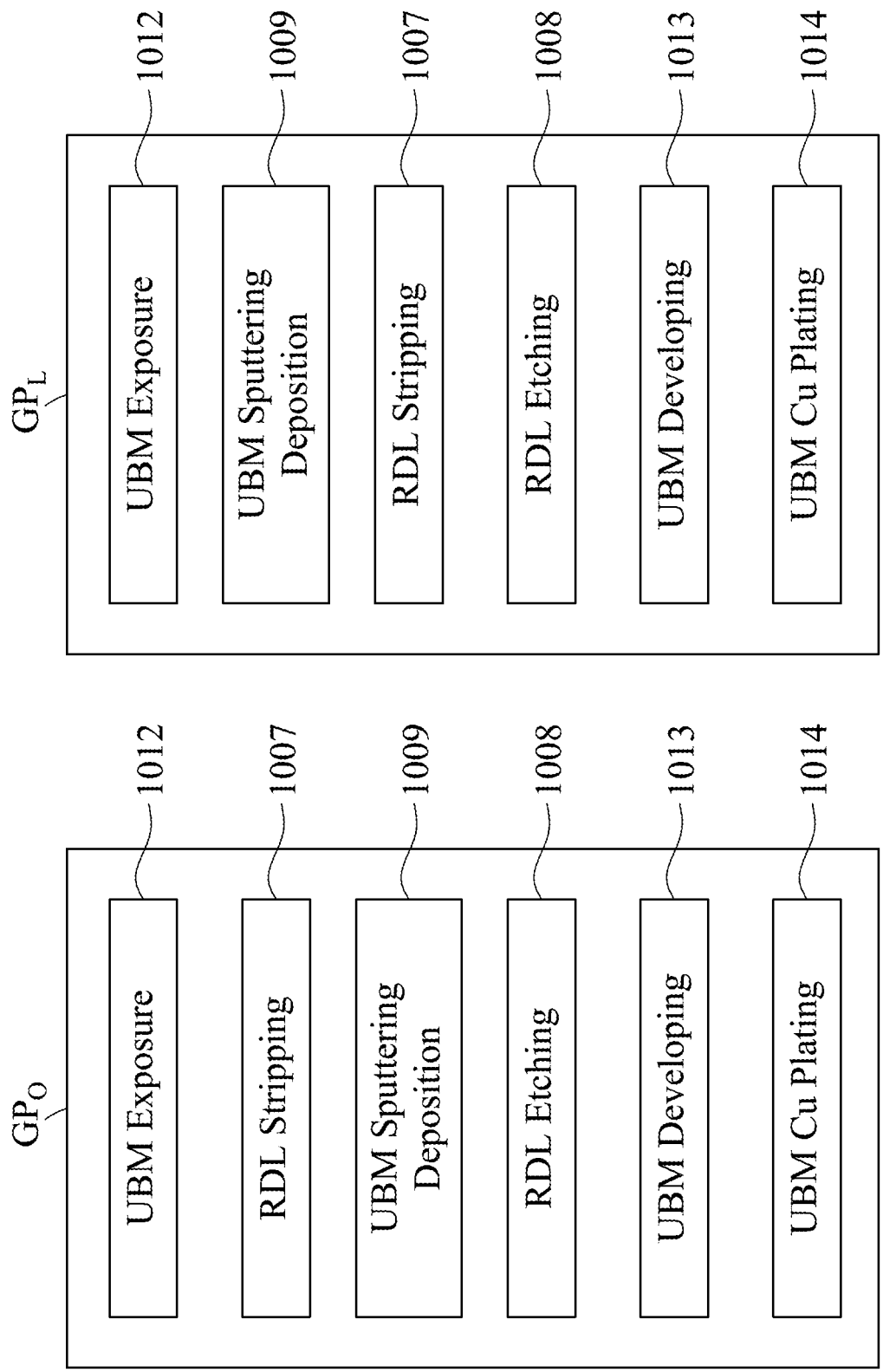
FIG. 8 is a schematic diagram showing six key process stages selected by a group least absolute shrinkage and selection operator (Group LASSO) algorithm and a group orthogonal greedy algorithm (Group OGA) of FIG. 6.

Referring to FIGS. 3 and 8, FIG. 8 is a schematic diagram showing six key process stages selected by a group least absolute shrinkage and selection operator (Group LASSO) algorithm and a group orthogonal greedy algorithm (Group OGA) of FIG. 6. The six key process stages ($GP_L$) selected by the Group LASSO are the exposure stage 1012 (UBM Exposure), the sputtering deposition stage 1009 (UBM Sputtering Deposition), the stripping stage 1007 (RDL Stripping), the etching stage 1008 (RDL Etching), the developing stage 1013 (UBM Developing) and the Cu plating stage 1014 (UBM Cu Plating), respectively. The six key process stages ($GP_O$) selected by the Group OGA are the exposure stage 1012 (UBM Exposure), the stripping stage 1007 (RDL Stripping), the sputtering deposition stage 1009 (UBM Sputtering Deposition), the etching stage 1008 (RDL Etching), the developing stage 1013 (UBM Developing) and the Cu plating stage 1014 (UBM Cu Plating), respectively. In the embodiment, the six key process stages ($GP_L$) selected by the Group LASSO are the same as the six key process stages ($GP_O$) selected by the Group OGA, but the present disclosure is not limited thereto.

The processing step S06 includes performing the second phase step (Phase-II), and the second phase step includes a plurality of steps S061, S062, S063, S064 and S065. The step S061 represents "Building prediction models of key paths" and includes building a plurality of prediction models of the key paths according to the production paths ($X_R$) and the sets of final inspection values (Y). The prediction models of the key paths include an interaction between at least two of the process devices of the process stages 1001-1019. The prediction models can be expressed as equation (3):

$$Y_t = \beta_0 + \Sigma_m \beta_m x_{tRm} + \Sigma_{k,m} \beta_{k,m} x_{tRkm} + \varepsilon_t \quad (3).$$

$Y_t$ is the yield rate of the $t^{th}$ sample, and $\beta_0$, $\beta_m$, $\beta_{k,m}$ are all coefficients. $\beta_0$ represents 0 after centralization, and $\beta_{k,m}$ represents the interaction between two (k, m) of the plurality of key process devices of the key process stages. The key process stages include the key process devices, and the key process devices are a part of the process devices. k, m represent the values corresponding to the key process devices. $x_{tR_{km}}$ represents $X_{tR_k} \times X_{tR_m}$. $X_{tR_k}$, $X_{tR_m}$ represent passing information of the two (k, m) of the key process devices of the key paths. Each of $X_{tR_k}$, $X_{tR_m}$ is equal to "1" or "0". "1" represents that the workpiece passes through the key process device, and "0" represents that the workpiece does not pass through the key process device. $\varepsilon_t$ is the random noise.

The step S062 represents "Choosing best model of each of key paths" and includes using an information criterion to calculate at least one information criterion value of each of the prediction models of each of the key paths. Each of the prediction models has at least one order ($O^{th}$) and includes at least one order prediction model. The at least one information criterion value is corresponding to the at least one order ($O^{th}$) and the at least one order prediction model. The step S062 further includes choosing one of the at least one order prediction model as a best model. The one of the at least one order prediction model has a smallest value of the at least one information criterion value. In one embodiment, the information criterion may be an Akaike Information Criterion (AIC), and the number of the at least one order ($O^{th}$) is smaller than 5 (O<5), but the present disclosure is not limited thereto. For example, the number of the at least one order ($O^{th}$) is equal to 4. Table 2 lists all orders ($1^{st}$, $2^{nd}$, $3^{rd}$ and $4^{th}$) of one of the key paths (e.g., a golden path Path 6; Top1) and corresponding order prediction models, and the order prediction models are corresponding to equation (3). $\beta_{a,b}$ represents the interaction between two (a, b) of the key process devices of the key process stages. $x_{tR_{ab}}$ represents $x_{tR_a} \times x_{tR_b}$. $\beta_{a,b,c}$ represents the interaction among three (a, b, c) of the key process devices of the key process stages. $x_{tR_{abc}}$ represents $x_{tR_a} \times x_{tR_b} \times x_{tR_c}$. $\beta_{a,b,c,d}$ represents the interaction among four (a, b, c, d) of the key process devices of the key process stages. $x_{tR_{abcd}}$ represents $x_{tR_a} \times x_{tR_b} \times x_{tR_c} \times x_{tR_d}$. Table 3 lists information criterion values of the order prediction models of one of the key paths (e.g., the golden path Path 6; Top1). The $4^{th}$ order prediction model is a best model because the $4^{th}$ order prediction model has the smallest value of the information criterion values. Table 4 lists coefficients of each of the orders of one of the key paths (e.g., the golden path Path 6; Top1), i.e., Table 4 lists coefficients which represents that there is the interaction between/among corresponding key process devices. Other coefficients which are not listed (e.g., $\beta_{2,4,6}$, $\beta_{2,3,4,5}$) in Table 4 represent that there is no interaction among corresponding key process devices. It is also worth mentioning that when the number of the order ($O^{th}$) is too large (e.g., greater than or equal to 5), the complexity of the order prediction model will be increased to increase the difficulty of prediction, so that the rationality of the number of the order need to be considered.

TABLE 2

| Order ($O^{th}$) | Model |
|---|---|
| $1^{st}$ | $Y_t = \beta_0 + \sum_a \beta_a x_{tRa} + \varepsilon_t$ |
| $2^{nd}$ | $Y_t = \beta_0 + \sum_a \beta_a x_{tRa} + \sum_a \beta_{a,b} x_{tRab} + \varepsilon_t$ |
| $3^{rd}$ | $Y_t = \beta_0 + \sum_a \beta_a x_{tRa} + \sum_{a,b} \beta_{a,b} x_{tRab} + \sum_{a,b,c} \beta_{a,b,c} x_{tRabc} + \varepsilon_t$ |
| $4^{th}$ | $Y_t = \beta_0 + \sum_a \beta_a x_{tRa} + \sum_{a,b} \beta_{a,b} x_{tRab} + \sum_{a,b,c} \beta_{a,b,c} x_{tRabc} + \sum_{a,b,c,d} \beta_{a,b,c,d} x_{tRabcd} + \varepsilon_t$ |

TABLE 3

| Order ($O^{th}$) | $1^{st}$ | $2^{nd}$ | $3^{rd}$ | $4^{th}$ |
|---|---|---|---|---|
| Information Criterion Values | 2058.57 | 2048.56 | 1995.79 | 1988.24 |

TABLE 4

| $\beta_1$ | $\beta_2$ | $\beta_3$ | $\beta_4$ | $\beta_5$ | $\beta e_6$ |
|---|---|---|---|---|---|

TABLE 4-continued

| | | | | | |
|---|---|---|---|---|---|
| −102.94 | −100 | −146.98 | −101.58 | −102.26 | −103.48 |
| $\beta_{1,2}$ | $\beta_{1,3}$ | $\beta_{1,4}$ | $\beta_{1,5}$ | $\beta_{1,6}$ | $\beta_{2,3}$ |
| −100.33 | 149.26 | 102.31 | 104.61 | 104.19 | 146.98 |
| $\beta_{2,4}$ | $\beta_{2,5}$ | $\beta_{2,6}$ | $\beta_{3,4}$ | $\beta_{3,5}$ | $\beta_{3,6}$ |
| −101.21 | 101.95 | 100.45 | 141.56 | −110.72 | 146.26 |
| $\beta_{4,5}$ | $\beta_{4,6}$ | $\beta_{5,6}$ | $\beta_{1,2,3}$ | $\beta_{1,2,4}$ | $\beta_{1,2,5}$ |
| 101.88 | 103.02 | 102.89 | 102.14 | 103.74 | −102.22 |
| $\beta_{1,2,6}$ | $\beta_{1,3,4}$ | $\beta_{1,3,5}$ | $\beta_{1,3,6}$ | $\beta_{1,4,5}$ | $\beta_{1,4,6}$ |
| −101.92 | −145 | 105.41 | −149.9 | 104.8 | −104.67 |
| $\beta_{1,5,6}$ | $\beta_{2,3,4}$ | $\beta_{2,3,5}$ | $\beta_{2,3,6}$ | $\beta_{2,4,5}$ | $\beta_{3,4,5}$ |
| −105.49 | 102.82 | −104.39 | −149.32 | 100.24 | 107.86 |
| $\beta_{3,4,6}$ | $\beta_{3,5,6}$ | $\beta_{4,5,6}$ | $\beta_{1,2,3,4}$ | $\beta_{1,2,3,5}$ | $\beta_{1,3,4,5}$ |
| −140.98 | 107.06 | −105.21 | −101.04 | 108.75 | −109.2 |
| $\beta_{1,3,4,6}$ | | | | | |
| 140.65 | | | | | |

The step S063 represents "Predicting yield rates of key paths according to best model" and includes predicting a plurality of yield rates corresponding to the key paths according to the prediction models. In other words, the step S063 includes predicting the yield rate $Y_P$ corresponding to each of the key paths according to the best model chosen in the step S062. The yield rate $Y_P$ can be expressed by equation (4):

$$Y_P = \beta_0 + \Sigma_m \beta_m x_{Rm} + \Sigma_{k,m} \beta_{k,m} x_{Rkm} \quad (4).$$

k, me P, and $Y_P$ represents the yield rate of the $P^{th}$ path. $x_{Rkm}$ represents $x_{R_k} \times x_{R_m}$. $x_{R_k}$, $x_{R_m}$ represent passing information of the two (k, m) of the key process devices of the $P^{th}$ path.

The step S064 represents "Ranking yield rates of key paths" and includes ranking the yield rates of the key paths to obtain a path ranking. The path ranking includes the golden path (Path 6; Top1), as listed in Tables 5 and 6. Table 5 lists the path ranking and the key process devices Dv1, Dv2, Dv3 and Dv4 of the key process stages, and Table 6 lists the path ranking, the predicted yield rate $Y_P$, the reliance index ($RI_{GP}$), the order of the best model, the number of passed workpiece and an actual yield rate. Top1 represents the golden path which has a highest predicted yield rate $Y_P$, and is the sixth path (Path 6) of the key paths. Last1 represents the worst path which has a lowest predicted yield rate $Y_P$. The order of the best model represents the order which has a smallest value of the information criterion values (AIC values) in the order prediction model of the path. The number of passed workpiece represents the number of times the workpiece passes through the corresponding path. The actual yield rate represents a mean value of the actual measured yield rates, i.e., a mean value of the of the final inspection values (Y). "NaN" represents no value, i.e., the corresponding path belongs to an untraveled path. If the number of passed workpiece is equal to 0, it represents that the corresponding path belongs to the untraveled path, and the actual yield rate corresponds to "NaN". If the number of passed workpiece is not equal to 0 (i.e., greater than or equal to 1), it represents that the corresponding path belongs to a traveled path, and the actual yield rate corresponds to the mean value of the actual measured yield rates. In other words, one of the key paths includes a plurality of key process devices, and the key process devices are corresponding to the key process stages, respectively (e.g., RDL stripping, RDL etching, UBM sputtering deposition, UBM exposure, UBM developing and UBM Cu plating in Table 5). The one of the key paths is classified as one of the untraveled path and the traveled path. The untraveled path represents that the one of the workpieces has not been processed by all of the key process devices in the key process stages when passing through the production line 100, and the traveled path represents that the one of the workpieces has been processed by all of the key process devices in the key process stages when passing through the production line 100.

TABLE 5

| Path ranking | RDL stripping | RDL etching | UBM sputtering deposition | UBM exposure | UBM developing | UBM Cu plating |
|---|---|---|---|---|---|---|
| Top1 (Path 6) | Dv2 | Dv2 | Dv3 | Dv2 | Dv2 | Dv1 |
| Top2 | Dv2 | Dv3 | Dv3 | Dv2 | Dv1 | Dv1 |
| Top3 | Dv2 | Dv2 | Dv3 | Dv2 | Dv1 | Dv1 |
| Top4 | Dv2 | Dv1 | Dv3 | Dv2 | Dv1 | Dv1 |
| Top5 | Dv2 | Dv3 | Dv1 | Dv2 | Dv2 | Dv1 |
| Last5 | Dv1 | Dv1 | Dv1 | Dv1 | Dv2 | Dv2 |
| Last4 | Dv1 | Dv4 | Dv1 | Dv2 | Dv3 | Dv2 |
| Last3 | Dv1 | Dv4 | Dv1 | Dv1 | Dv2 | Dv2 |
| Last2 | Dv1 | Dv4 | Dv1 | Dv2 | Dv2 | Dv2 |
| Last | Dv1 | Dv4 | Dv1 | Dv1 | Dv3 | Dv2 |

TABLE 6

| Path ranking | Predicted yield rate ($Y_P$) | $RI_{GP}$ | Order of best model | Number of passed workpiece | Actual yield rate |
|---|---|---|---|---|---|
| Top1 (Path 6) | 99.991 | 0.9976 | 4 | 0 | NaN |
| Top2 | 99.56 | 0.9961 | 3 | 1 | 99.55 |
| Top3 | 99.94 | 0.997 | 3 | 0 | NaN |
| Top4 | 99.93 | 0.9881 | 3 | 1 | 100 |
| Top5 | 99.9 | 0.9987 | 3 | 0 | NaN |
| . | . | . | . | . | . |
| . | . | . | . | . | . |
| . | . | . | . | . | . |
| Last5 | 87.94 | 0.9773 | 4 | 0 | NaN |
| Last4 | 87.11 | 0.9834 | 4 | 0 | NaN |
| Last3 | 86.45 | 0.9977 | 4 | 1 | 86.65 |
| Last2 | 85.49 | 0.996 | 4 | 0 | NaN |
| Lasti | 83.85 | 0.9935 | 4 | 2 | 83.85 |

The step S065 represents "Creating golden path of key paths" and includes searching the golden path of the key paths according to the yield rates $Y_P$. The golden path is corresponding to a best one of the yield rates $Y_P$. In one embodiment, the golden path may be plural in number (e.g., top ten paths, i.e., Top1-Top10).

The processing step S08 represents "Confirming reliance index of key paths" and includes calculating the yield rates $Y_P$, a correlation $Corr(x_{R\theta})$ between the production paths ($X_R$) and the sets of final inspection values (Y), and a maximum value ($Y_{max}$) and a minimum value ($Y_{min}$) of the sets of final inspection values (Y), thereby obtaining the reliance index ($RI_{GP}$) to gauge a reliance level of identified results. The reliance index ($RI_{GP}$) can be expressed by equation (5):

$$RI_{GP}(kp) = 1 - \frac{Y_p - \sum_{\theta=1}^{i} \text{Corr}(x_{R\theta})}{Y_{max} - Y_{min}} \quad (5).$$

$RI_{GP}(kp)$ represents the reliance index of the $P^{th}$ path. In the embodiment of Table 5, $RI_{GP}(kp)$ of the golden path (Path 6; Top1) is 0.9976. In other words, the reliability of the golden path searched by the present disclosure is quite high.

Therefore, the golden path search method 300 for manufacturing process of the present disclosure can search the golden path by two specific phase steps, and the golden path can include the untraveled path, so that the golden path search can be considered comprehensively. In addition, the two specific phase steps can search the golden path with a best one (or a better one) of the yield rates from all possible manufacturing paths of the production line 100, so that the golden path may be used by product manufacturers to effectively improve the manufacturing yield, and the reliability of the golden path searched by the present disclosure is quite high. Moreover, by predicting the yield rates according to the best model and ranking the yield rates of the two specific phase steps, the present disclosure can simultaneously check all orders of the key paths and all order prediction models corresponding to the orders to select the best model and the golden path corresponding to the best one of the yield rates. Moreover, the present disclosure can consider the interaction between/among the key process devices to reflect the effect of the yield rates caused by the interaction between/among the key process devices.

Figure 9A:
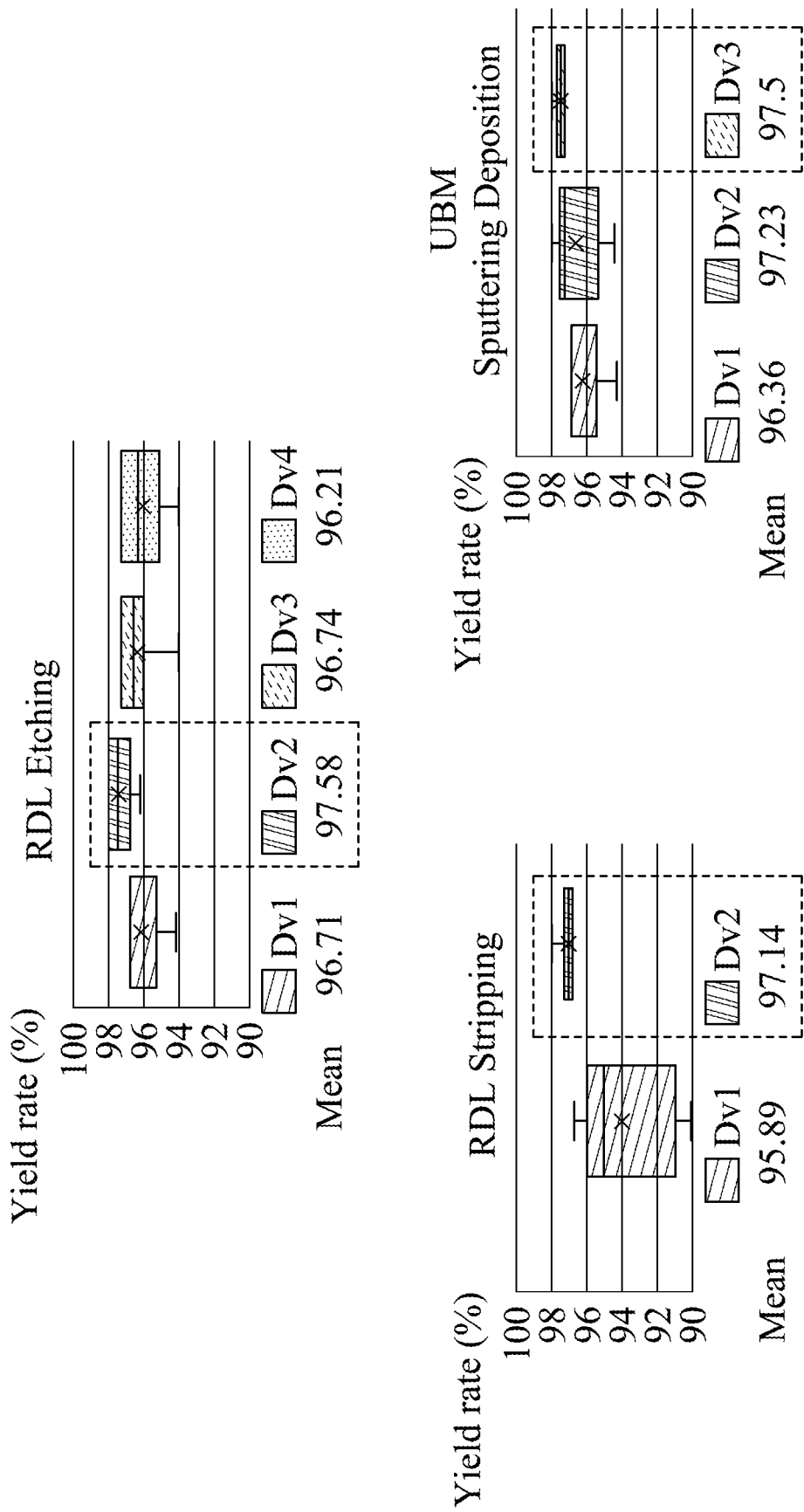
FIG. 9A is a schematic diagram showing a plurality of yield rates of three of the six key process stages of the present disclosure.
Figure 9B:
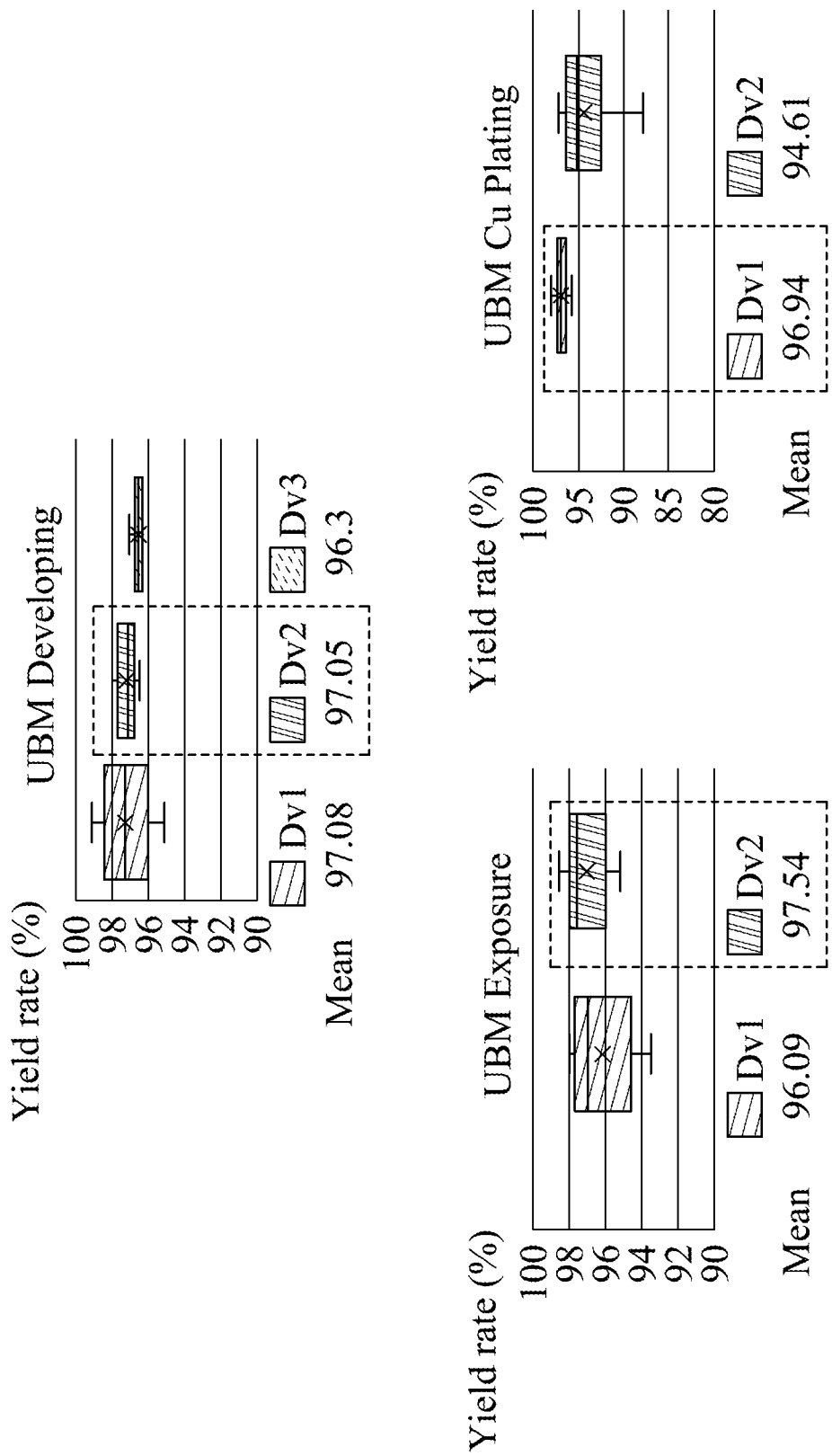
FIG. 9B is a schematic diagram showing the yield rates of the other three of the six key process stages of the present disclosure.

Referring to FIGS. 2, 8, 9A and 9B, FIG. 9A is a schematic diagram showing a plurality of yield rates $Y_P$ of three (i.e., the stripping stage 1007 (RDL stripping), the etching stage 1008 (RDL Etching) and the sputtering deposition stage 1009 (UBM Sputtering Deposition)) of the six key process stages of the present disclosure; and FIG. 9B is a schematic diagram showing the yield rates $Y_P$ of the other three (i.e., the exposure stage 1012 (UBM Exposure), the developing stage 1013 (UBM Developing) and the Cu plating stage 1014 (UBM Cu Plating)) of the six key process stages of the present disclosure. The dotted frames are the key process devices of the golden path (Path 6; Top1). The key process devices of the six key process stages of the golden path are Dv2, Dv2, Dv3, Dv2, Dv2 and Dv1 in sequence, as listed in Table 5. In FIGS. 9A and 9B, in each of the key process stages, all the key process devices of the golden path possess higher mean value of the yield rates. Except for the key process device Dv2 of UBM developing (the developing stage 1013), the key process devices of the other key process stages possess highest mean value of the yield rates. The key process device Dv2 of UBM developing (the developing stage 1013) possesses second highest mean value of the yield rates. It is also worth mentioning that the number $S_6$ of the key paths selected by the present disclosure is equal to the product of the number of the key process devices of the six key process stages, i.e., $S_6=S_{TOP1}\times S_{TOP2}\times S_{TOP3}\times S_{TOP4}\times S_{TOP5}\times S_{TOP6}=2\times 4\times 3\times 2\times 2\times 3=288$. $S_{TOP1}$, $S_{TOP2}$, $S_{TOP3}$, $S_{TOP4}$, $S_{TOP5}$ and $S_{TOP6}$ represent the numbers of the key process devices of the six key process stages, respectively. The number $S_6$ is far less than the total number (1,433,272,320) of all possible manufacturing paths of the production line 100. Therefore, the present disclosure can greatly reduce the number of paths to be confirmed by identifying the key process stages of the first phase step, thereby effectively improving the efficiency of path search.

It is understood that the golden path search method 300 for manufacturing process is performed by the aforementioned steps. A computer program of the present disclosure stored on a non-transitory tangible computer readable recording medium is used to perform the method described above. The aforementioned embodiments can be provided as a computer program product, which may include a machine-readable medium on which instructions are stored for programming a computer (or other electronic devices) to perform a process based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

It is also noted that the present disclosure also can be described in the context of a manufacturing system. Although the present disclosure may be implemented in semiconductor fabrication, the present disclosure is not limited to implementation in semiconductor fabrication and may be applied to other manufacturing industries, in which the manufacturing system is configured to fabricate workpieces or products including, but not limited to, microprocessors, memory devices, digital signal processors, application specific integrated circuits (ASICs), or other similar devices. The present disclosure may also be applied to workpieces or manufactured products other than semiconductor devices, such as vehicle wheels, screws. The manufacturing system includes one or more processing tools that may be used to form one or more products, or portions thereof, in or on the workpieces (such as wafers). Persons of ordinary skill in the art should appreciate that the processing tools may be implemented in any number of entities of any type, including lithography tools, deposition tools, etching tools, polishing tools, annealing tools, machine tools, and the like. In the embodiments, the manufacturing system also includes one or more metrology tools, such as scatterometers, ellipsometers, scanning electron microscopes, and the like.

According to the aforementioned embodiments and examples, the advantages of the present disclosure are described as follows.

1. The present disclosure can greatly reduce the number of paths to be confirmed by identifying the key process stages of the first phase step, thereby effectively improving the efficiency of path search. In other words, the present disclosure can search a golden path with a best one (or a better one) of the yield rates from all possible manufacturing paths of the production line, so that the golden path may be used by product manufacturers to effectively improve the manufacturing yield, and the reliability of the golden path searched by the present disclosure is quite high.

2. By predicting the yield rates according to the best model and ranking the yield rates of the second phase step, the present disclosure can simultaneously check all orders of the key paths and all order prediction models corresponding to the orders to select the best model and the golden path corresponding to the best one of the yield rates. Moreover, the present disclosure can consider the interaction between/ among the key process devices to reflect the effect of the yield rates caused by the interaction between/among the key process devices.

3. The golden path search algorithm (GPSA) of the present disclosure can plan the golden path with high yield under the condition of the number of variables being much larger than that of samples, thus effectively improving the manufacturing yield. Hence, the GPSA is suitable for the multistage manufacturing process (MMP) environment. In addition, the GPSA can be realized by two specific phase steps, and the golden path can include the untraveled path, so that the golden path search can be considered comprehensively.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A golden path search method for manufacturing process, comprising:
providing a production line comprising a plurality of process stages;
providing each of the process stages with a plurality of process devices;
processing a plurality of workpieces by the process devices;
processing the workpieces according to a plurality of production paths respectively, and each of the production paths indicating each of the process devices in the process stages for processing one of the workpieces;
performing at least one yield test on each of the workpieces after passing through the production line, thereby obtaining a plurality of sets of final inspection values corresponding to the workpieces respectively;
performing a first phase step, the first phase step comprising:
preparing a searching model based on a searching algorithm, wherein the searching algorithm is one of a group least absolute shrinkage and selection operator (Group LASSO) algorithm and a group orthogonal greedy algorithm (Group OGA); and
selecting a plurality of key process stages of the process stages by feeding the sets of final inspection values and the production paths of the workpieces into the searching model, and then generating a plurality of key paths according to the key process stages;
performing a second phase step, the second phase step comprising:
building a plurality of prediction models of the key paths according to the production paths and the sets of final inspection values; and
predicting a plurality of yield rates corresponding to the key paths according to the prediction models, and then searching a golden path of the key paths according to the yield rates, wherein the golden path is corresponding to a best one of the yield rates; and
processing the workpieces by the process devices utilizing the golden path of the key paths, wherein the workpieces are physical workpieces, the process devices are physical devices used to manufacture the physical workpieces, and the golden path of the key paths corresponds to the best one of the yield rates;
wherein the first phase step further comprises:
counting a passing rate of each of the workpieces passing through each of the process devices, so that the process devices have a plurality of the passing rates, and then filtering out a part of the process devices whose passing rates are smaller than a predetermined passing rate, wherein the predetermined passing rate is smaller than or equal to 5%.

2. The golden path search method for manufacturing process as claimed in claim 1, wherein in the second phase step, the prediction models of the key paths comprise an interaction between at least two of the process devices of the process stages.

3. The golden path search method for manufacturing process as claimed in claim 2, wherein the second phase step further comprises:
using an information criterion to calculate at least one information criterion value of each of the prediction models of each of the key paths, wherein each of the prediction models has at least one order and comprises at least one order prediction model, and the at least one information criterion value is corresponding to the at least one order and the at least one order prediction model; and
choosing one of the at least one order prediction model as a best model, wherein the one of the at least one order prediction model has a smallest value of the at least one information criterion value.

4. The golden path search method for manufacturing process as claimed in claim 3, wherein the information criterion is an Akaike Information Criterion (AIC), and a number of the at least one order is smaller than 5.

5. The golden path search method for manufacturing process as claimed in claim 1, wherein the second phase step further comprises:
ranking the yield rates of the key paths to obtain a path ranking, wherein the path ranking comprises the golden path; and
calculating a correlation between the production paths and the sets of final inspection values, and a maximum value and a minimum value of the sets of final inspection values, thereby obtaining a reliance index to gauge a reliance level of identified results.

6. The golden path search method for manufacturing process as claimed in claim 1, wherein one of the key paths comprises a plurality of key process devices, the key process devices are corresponding to the key process stages, respectively, the one of the key paths is classified as one of an untraveled path and a traveled path, the untraveled path represents that the one of the workpieces has not been processed by all of the key process devices in the key process stages when passing through the production line, and the traveled path represents that the one of the workpieces has been processed by all of the key process devices in the key process stages when passing through the production line.

7. A golden path search system for manufacturing process, which is configured to search a golden path of a production line, the production line comprising a plurality of process stages, each of the process stages comprising a plurality of process devices, each of the process devices configured for processing one of a plurality of workpieces, and the golden path search system for manufacturing process comprising:

a memory storing production information and a plurality of sets of final inspection values corresponding to the workpieces, wherein the production information comprises a plurality of production paths, each of the production paths indicates each of the process devices in the process stages for processing one of the workpieces, and the sets of final inspection values are obtained by performing at least one yield test on each of the workpieces after passing through the production line; and a processor electrically connected to the memory, wherein the processor receives the production paths and the sets of final inspection values, and is configured to:

perform a first phase step, the first phase step comprising:
    preparing a searching model based on a searching algorithm, wherein the searching algorithm is one of a group least absolute shrinkage and selection operator (Group LASSO) algorithm and a group orthogonal greedy algorithm (Group OGA); and
    selecting a plurality of key process stages of the process stages by feeding the sets of final inspection values and the production paths of the workpieces into the searching model, and then generating a plurality of key paths according to the key process stages; and perform a second phase step, the second phase step comprising:
    building a plurality of prediction models of the key paths according to the production paths and the sets of final inspection values; and
    predicting a plurality of yield rates corresponding to the key paths according to the prediction models, and then searching the golden path of the key paths according to the yield rates, wherein the golden path is corresponding to a best one of the yield rates;

wherein the workpieces are processed by the process devices utilizing the golden path of the key paths, wherein the workpieces are physical workpieces, the process devices are physical devices used to manufacture the physical workpieces, and the golden path of the key paths corresponds to the best one of the yield rates;

wherein the first phase step further comprises:
    counting a passing rate of each of the workpieces passing through each of the process devices, so that the process devices have a plurality of the passing rates, and then filtering out a part of the process devices whose passing rates are smaller than a predetermined passing rate, wherein the predetermined passing rate is smaller than or equal to 5%.

8. The golden path search system for manufacturing process as claimed in claim 7, wherein in the second phase step, the prediction models of the key paths comprise an interaction between at least two of the process devices of the process stages.

9. The golden path search system for manufacturing process as claimed in claim 8, wherein the second phase step further comprises:
    using an information criterion to calculate at least one information criterion value of each of the prediction models of each of the key paths, wherein each of the prediction models has at least one order and comprises at least one order prediction model, and the at least one information criterion value is corresponding to the at least one order and the at least one order prediction model; and
    choosing one of the at least one order prediction model as a best model, wherein the one of the at least one order prediction model has a smallest value of the at least one information criterion value.

10. The golden path search system for manufacturing process as claimed in claim 9, wherein the information criterion is an Akaike Information Criterion (AIC), and a number of the at least one order is smaller than 5.

11. The golden path search system for manufacturing process as claimed in claim 7, wherein the second phase step further comprises:
    ranking the yield rates of the key paths to obtain a path ranking, wherein the path ranking comprises the golden path; and
    calculating a correlation between the production paths and the sets of final inspection values, and a maximum value and a minimum value of the sets of final inspection values, thereby obtaining a reliance index to gauge a reliance level of identified results.

12. The golden path search system for manufacturing process as claimed in claim 7, wherein one of the key paths comprises a plurality of key process devices, the key process devices are corresponding to the key process stages, respectively, the one of the key paths is classified as one of an untraveled path and a traveled path, the untraveled path represents that the one of the workpieces has not been processed by all of the key process devices in the key process stages when passing through the production line, and the traveled path represents that the one of the workpieces has been processed by all of the key process devices in the key process stages when passing through the production line.

* * * * *